United States Patent [19]

Rode

[11] Patent Number: 4,753,130

[45] Date of Patent: Jun. 28, 1988

[54] TRANSMISSION WITH INTERCHANGEABLE SHAFTS TO LINK ONE OR MORE DRIVES WITH ONE OR MORE OUTPUT SHAFTS

[75] Inventor: Udo Rode, Hörstel, Fed. Rep. of Germany

[73] Assignee: Renk Tacke GmbH, Augsburg, Fed. Rep. of Germany

[21] Appl. No.: 938,278

[22] Filed: Dec. 5, 1986

[30] Foreign Application Priority Data

Dec. 12, 1985 [DE] Fed. Rep. of Germany ....... 3543926

[51] Int. Cl.⁴ .............................................. F16H 37/06
[52] U.S. Cl. .................. 74/665 R; 74/665 B; 74/665 G; 74/665 L
[58] Field of Search ............ 74/665 R, 665 A, 665 B, 74/665 D, 665 E, 665 F, 665 G, 665 GA, 665 L, 665 N, 665 Q, 400, 401; 464/156, 158, 159

[56] References Cited

U.S. PATENT DOCUMENTS

| | | | |
|---|---|---|---|
| 2,151,834 | 3/1939 | Bugatti | 464/156 |
| 4,182,200 | 1/1980 | Steinberg et al. | 74/665 R X |
| 4,612,824 | 9/1986 | Rühle | 74/665 F |

FOREIGN PATENT DOCUMENTS 2309765 11/1976 France ................. 464/156

Primary Examiner—Leslie A. Braun
Assistant Examiner—James Innskeep
Attorney, Agent, or Firm—Peter K. Kontler

[57] ABSTRACT

A versatile transmission, particularly a test stand transmission, in which internally and/or externally toothed conversion elements can be inserted from the outside to transmit torque from gears driven by one or more input shafts to one or more output shafts.

13 Claims, 6 Drawing Sheets

TRANSMISSION WITH INTERCHANGEABLE SHAFTS TO LINK ONE OR MORE DRIVES WITH ONE OR MORE OUTPUT SHAFTS

BACKGROUND OF THE INVENTION

The invention relates to a transmission, particularly as test stand transmission, for transmitting torque form one or more drives or drive units to one or more output shafts or other output units.

In transmissions for test room installations for driving flow machines, for example pumps, compressors or for connecting machines to be driven to turbines and other drive machines and also for other parts to be tested, it is known to use single-stage or multi-stage shift transmissions for transmitting torque between a drive and one or more outputs. There is also the possibility of using shift transmissions for several drives. A transmission matched to a particular application is provided for each such application. Therefore if the requirements or test conditions determined by the application are changed, replacement of the transmission and considerable expense connected therewith cannot be avoided.

OBJECTS AND SUMMARY OF THE INVENTION

An object of the invention is to provide a transmission whose range of application is widened so that it meets several different requirements. The solution according to the invention includes the provision of hollow shafts having gears, with interchangeable core shafts being insertable as coupling parts into the hollow shafts in a manner free of supporting bearings in order to add to the power output, i.e., to combine torques from several hollow shafts by connecting several hollow shafts to each other, to divide the power output, i.e., to divide the torque received from one of the hollow shafts among several output units, or to transmit torque from a single hollow shaft to a single output unit independently of the other hollow shaft or shafts and core shaft or shafts and as a function of the direction of rotation determined by the intended application. The hollow shafts are preferably coaxial and are connected to a hollow output shaft via a double cardanic toothed coupling, namely by a plurality of cardanic joints. The hollow shafts are provided with internal teeth arranged to mate with external teeth of the core shafts. The core shafts can be pushed axially into the open ends of the hollow shafts.

An important advantage of the transmission according to the invention is that, with a single transmission and merely some additional core shafts of various length, several different applications of the transmission are made possible.

DESCRIPTION OF THE PREFERRED EMBODIMENTS

Figure 1:
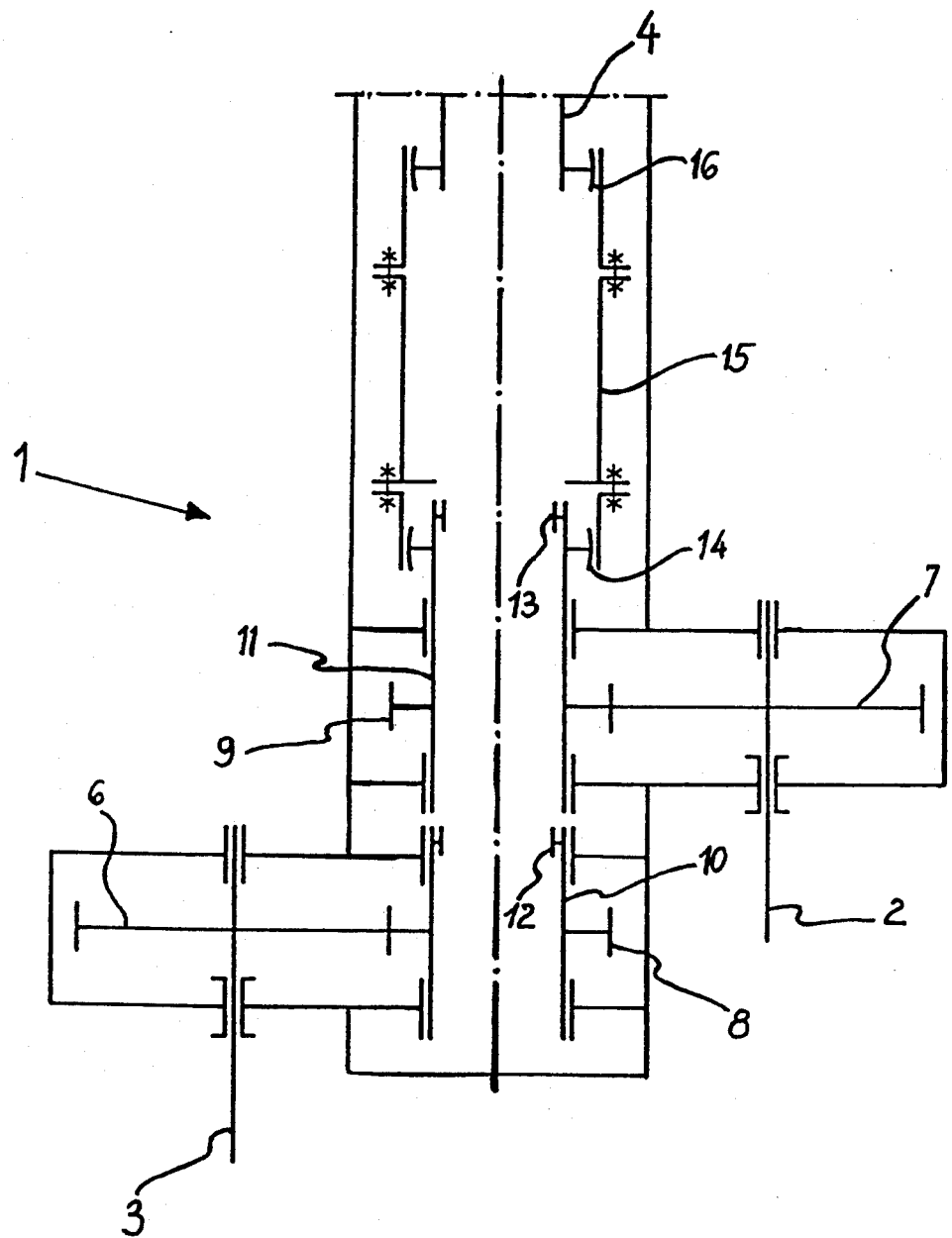
FIG. 1 shows a transmission with first and second drive shafts and an output shaft, the second drive shaft being capable of transmitting torque only to the corresponding hollow shaft because the core shaft is omitted.
Figure 3:
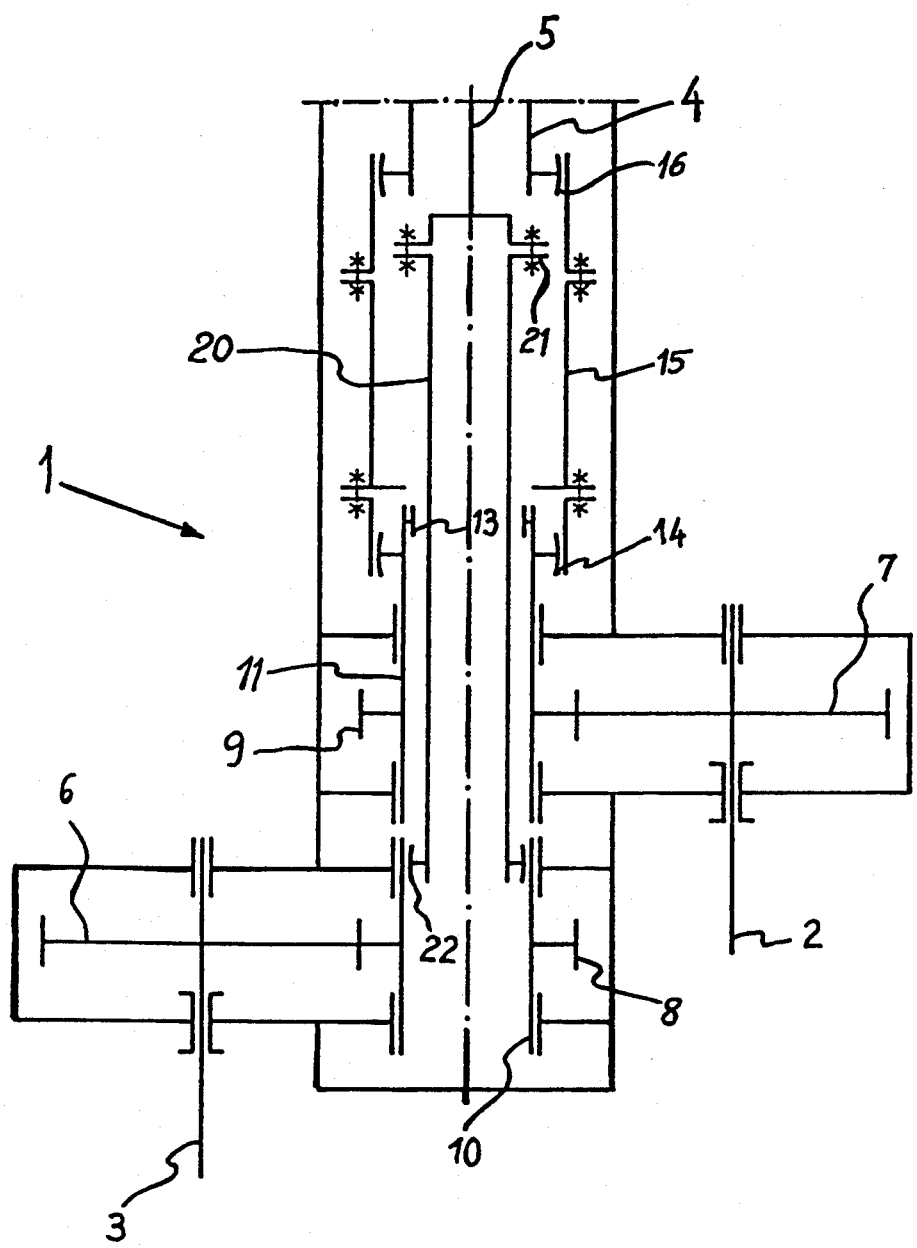
FIG. 3 shows the transmission with an inserted core shaft for transmission of torque from two drive units to two output units.
Figure 4:
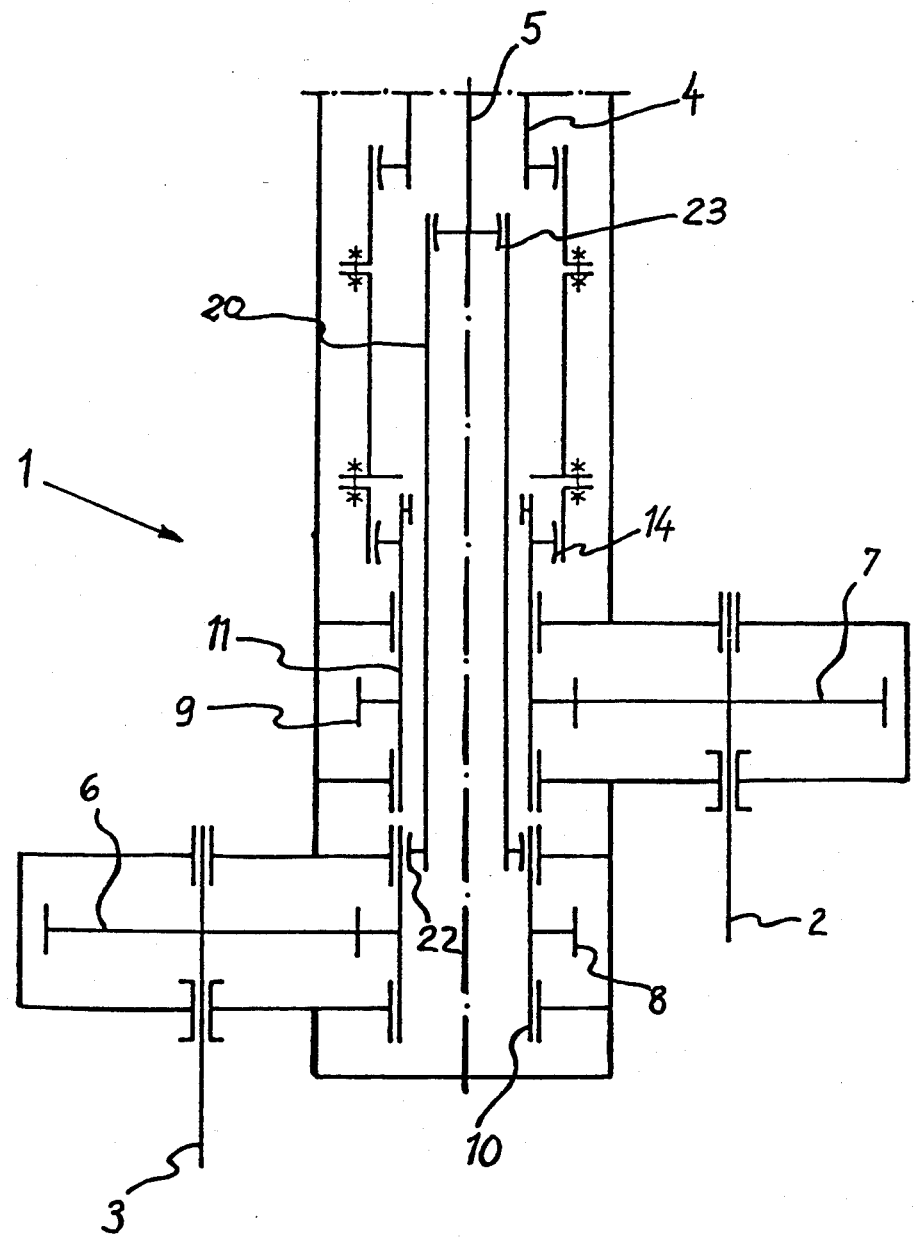
FIG. 4 shows the transmission according to FIG. 3, but with a toothed coupling between the core shaft and the output shaft.
Figure 5:
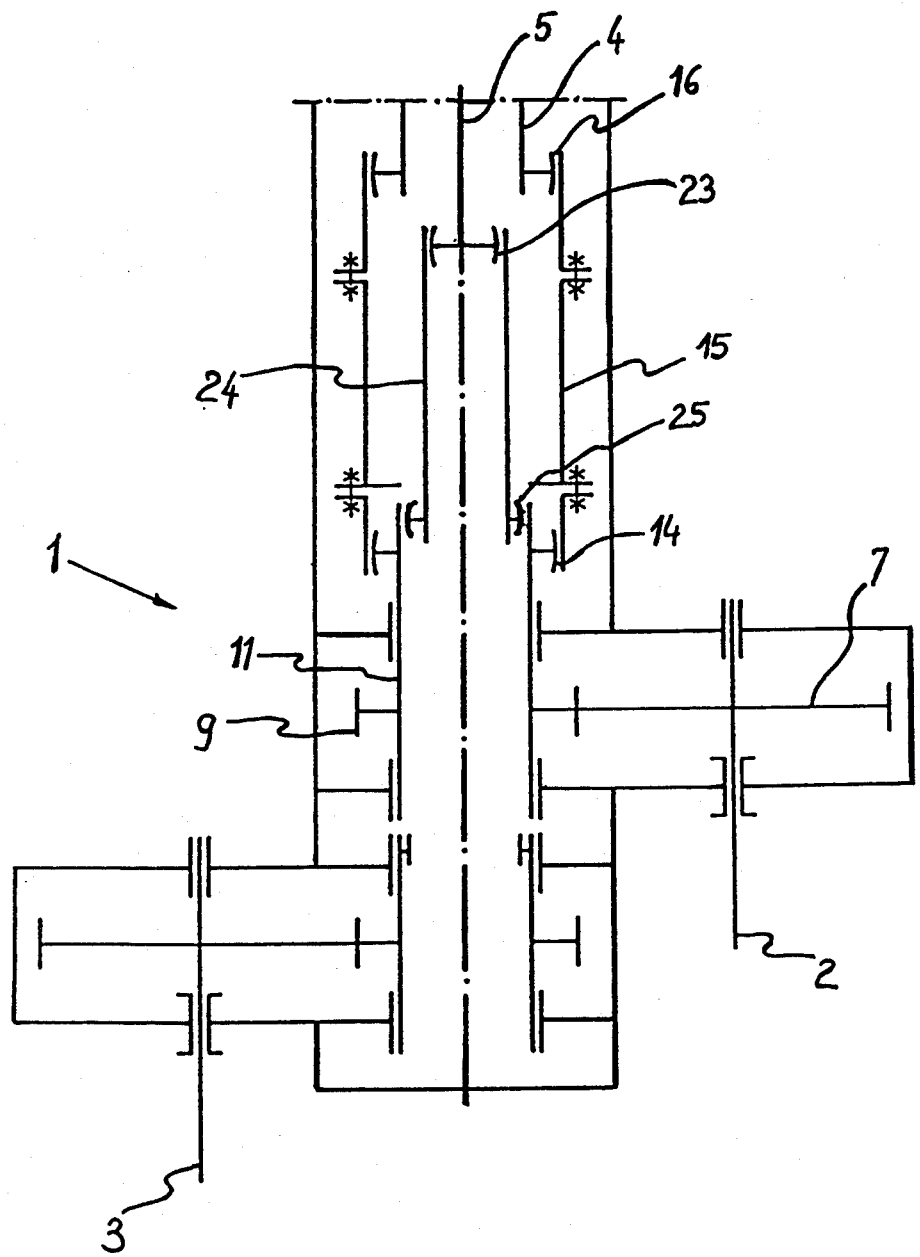
FIG. 5 shows a transmission wherein torque is transmitted from one of the drive units to two output shafts.
Figure 6:
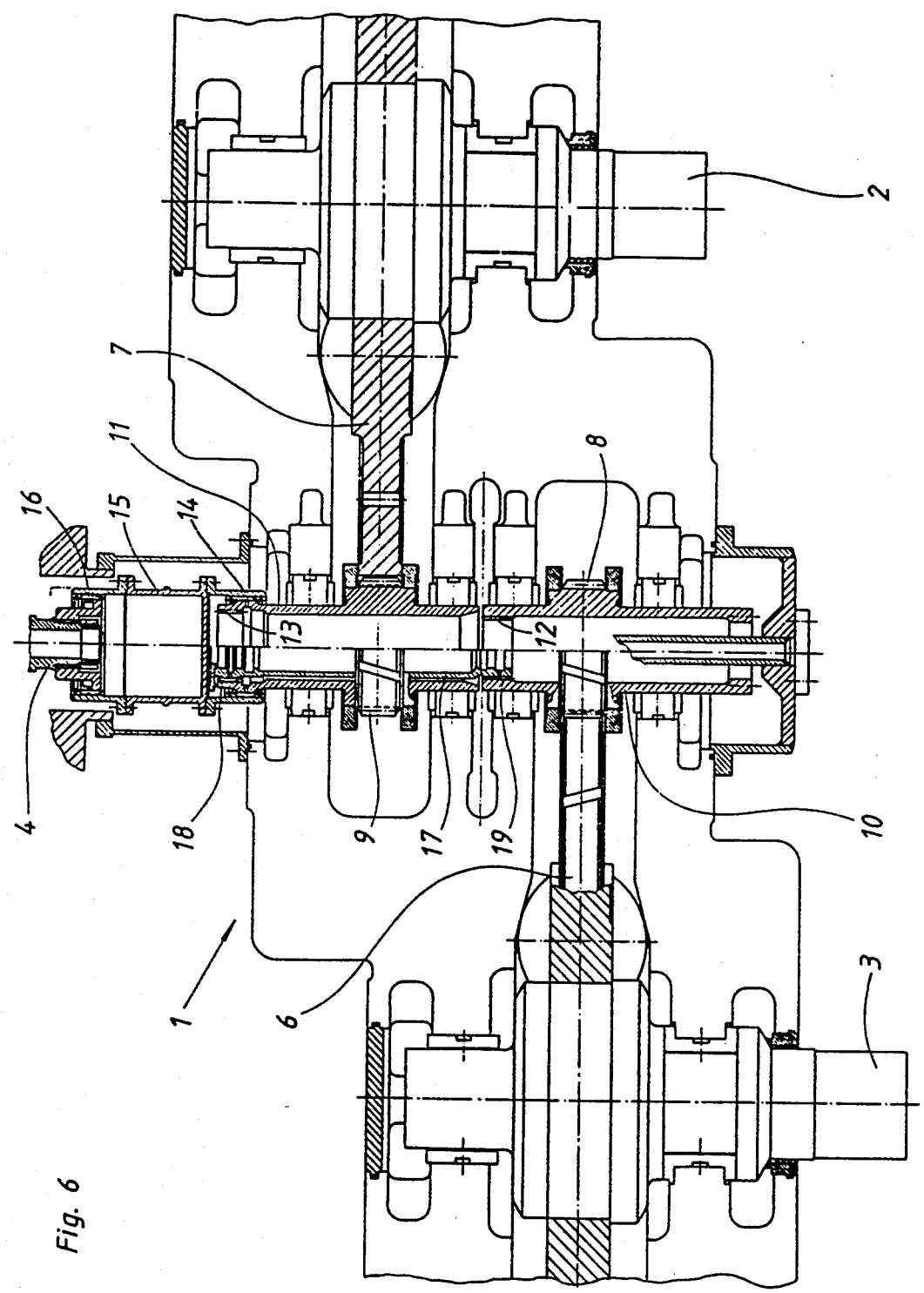
FIG. 6 is a sectional view of the transmission which is shown in FIG. 2.

The transmission 1 of FIG. 1 has two drive units or shafts 2 and 3 for connection with drives which are independent of one another, and a hollow tubular output shaft 4 through which an additional output shaft 5, independent thereof can extend concentrically if necessary (FIGS. 3 to 5). The shafts 2 and 3 transmit torque to gears 8 and 9 via pinions 7 and 6. The gears are mounted on hollow transmission shafts 10 and 11 which are independent of one another. The shafts 10 and 11 are respectively provided with internal gears 12 and 13.

In addition, the hollow shaft 11 has an external gear 14 with crowned tooth flanks for transmitting torque via coupling sleeve 15 to the external gear 16 of the hollow output shaft 4, which external gear 16 is likewise provided with crowned tooth flanks. The toothed coupling 14, 15 and 16 is therefore double cardanic (i.e., it has two cardanic joints) and can compensate both for axial and angular displacements.

Figure 2:
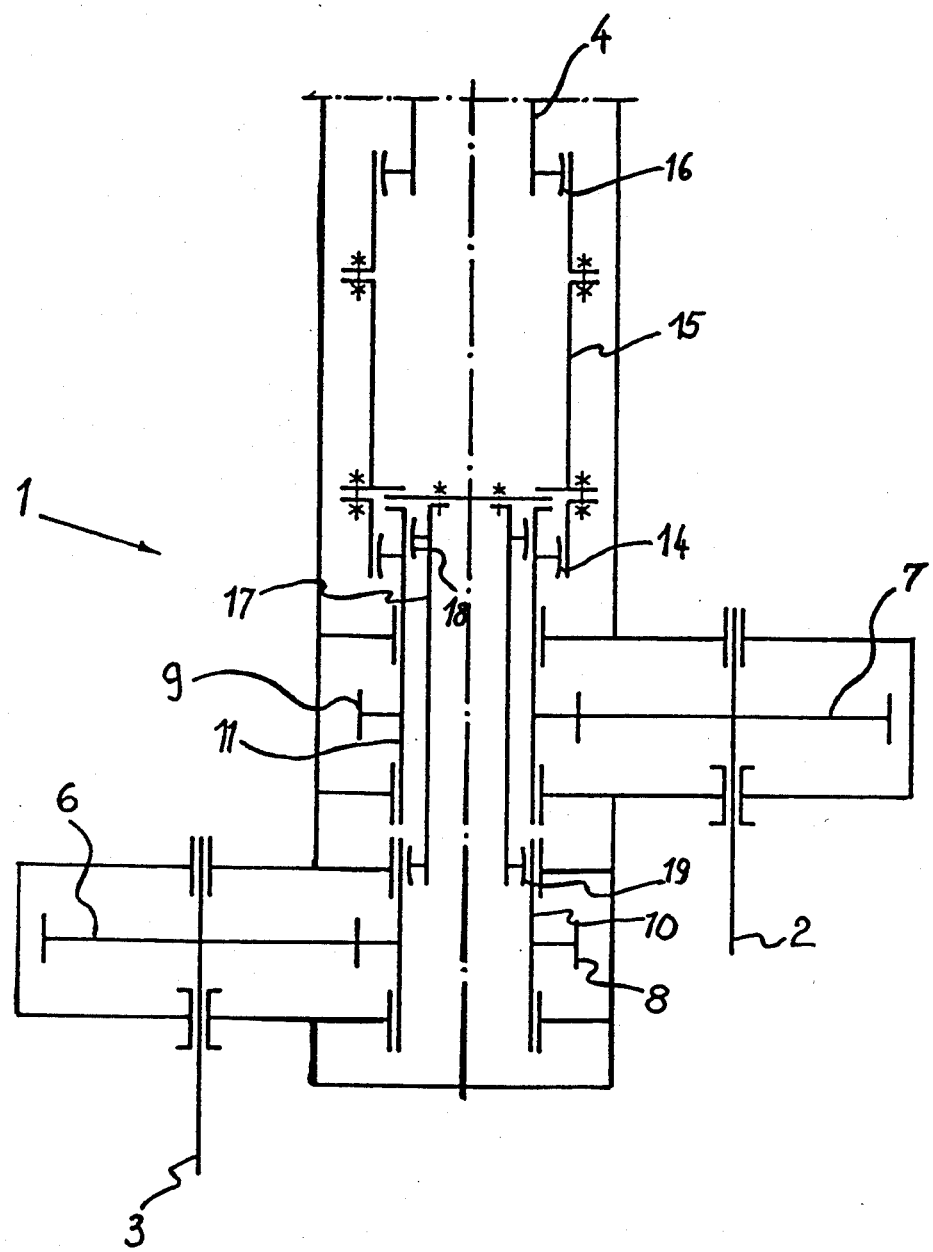
FIG. 2 shows the transmission according to FIG. 1, set up for transmitting torque from both drive shafts to an output shaft.

FIG. 2 shows the same transmission but converted for adding to the power output by connecting the two hollow shafts 10 and 11 by an inserted core shaft 17 which, with its external gears 18 and 19, mates with the internal gears 12 and 13 (not shown in FIG. 2) of the hollow shafts and connects the latter to one another. This enables the transmission to transmit torque from each of the drive shafts 2 and 3 to the tubular output shaft 4.

FIG. 3 shows a further possible application. The transmission 1 is provided with a long core shaft 20 which extends from the hollow shaft 10 to the second or additional output shaft 5 arranged concentrically inside the tubular output shaft 4. The core shaft 20 is firmly flanged at 21 to the output shaft 5, and its driven end mates with the internal gear 12 (not shown in FIG. 3) of the hollow shaft 10 and is provided for this purpose with an external gear 22 having teeth with crowned flanks. As a result of insertion of the long core shaft 20, it is possible to transmit torque from the drive shaft 2 to the tubular output shaft 4 and from the second drive shaft 3 to the inner output shaft 5, that is separate from the drive shaft 2.

The transmission according to FIG. 4 essentially corresponds to that of FIG. 3 with the difference that, at the transition from the output shaft 5 to the core shaft 20, the bolted connection is replaced by a toothed coupling 23. Here, as in the exemplary embodiment according to FIG. 3, the core shaft 20 is supported only by the toothed couplings 22 and 23, that is, it does not require a supporting bearing. All core shafts are freely adjustable with respect to extension and play. Such construction permits free adjustability between the drive motors. The disadvantages of an uncertain mounting, which lead to wear and noise, are avoided. Limitation in the speed is avoided.

FIG. 5 shows a further modification. Torque transmission from the drive shaft 3 to one of the output shafts is not possible. On the other hand, torque is transmitted from the drive shaft 2 via the drive pinion 7 and the spur gear 9 to the hollow shaft 11 which is connected both to the tubular outer output shaft 4 via toothed coupling 14, 15 and 16 and to the inner output shaft 5 via inserted core shaft 24 which is provided with a crowned external gear 25 mating with the internal gear 13 (not shown) of the hollow shaft 11. It is therefore possible to transmit torque from one drive unit to two tested parts which are independent of one another.

With the transmission shown as an exemplary embodiment, four different applications are possible with only minor conversion work which does not require opening up the transmission.

I claim:

1. A transmission, particularly a test stand transmission, for transmitting torque from at least one drive unit to at least one output unit, comprising a plurality of hollow torque transmitting shafts; and an interchangeable core shaft insertable into at least one of said hollow shafts free of supporting bearings and having means for receiving torque from the at least one hollow shaft, said core shaft being selectable so as to either combine torques from several hollow shafts by connecting several hollow shafts to each other or, to divide the torque received from one of the hollow shafts among several output units, or to transmit torque from a selected hollow shaft to a single output unit.

2. The transmission of claim 1, wherein said hollow shafts are coaxial and further comprising an output shaft, a coupling shaft, a first cardanic joint between said output shaft and said coupling shaft, and a second cardanic joint between said coupling shaft and said interchangeable core shaft, said hollow shafts having internal gears and the torque receiving means of said interchangeable core shaft including at least one external gear mating with the internal gear of one of said hollow shafts.

3. The transmission of claim 2, wherein said first cardanic joint includes a crowned external gear on said output shaft.

4. The transmission of claim 1, wherein said interchangeable core shaft has at least one crowned external gear.

5. The transmission of claim 1, wherein the torque receiving means of said interchangeable core shaft includes means for connecting two hollow shafts to each other.

6. The transmission of claim 1, further comprising a tubular first output shaft and a second output shaft disposed within said first output shaft, said output shafts being coaxial with said hollow shafts and said interchangeable core shaft receiving torque from one of said hollow shafts and having means for transmitting torque to said second output shaft.

7. The transmission of claim 1, wherein the play and extension of said interchangeable core shaft are freely adjustable.

8. The transmission of claim 1, further comprising a tubular first output shaft and a second output shaft disposed within said first output shaft, said output shafts being coaxial with said hollow shafts and said second output shaft having a crowned external gear, said interchangeable core shaft having a crowned internal gear arranged to mate with said external gear.

9. The transmission of claim 1, wherein each of said hollow shafts has an open axial end and said interchangeable core shaft is insertable into and withdrawable from said hollow shafts by way of the respective open axial ends.

10. The transmission of claim 1, comprising a discrete drive unit for each of said hollow shafts.

11. The transmission of claim 1, further comprising an output shaft and means for fixedly connecting said output shaft to said interchangeable core shaft.

12. The transmission of claim 1, further comprising an output shaft and a toothed coupling between said output shaft and said interchangeable core shaft.

13. The transmission of claim 1, wherein the torque receiving means of said interchangeable core shaft includes at least one external gear on the interchangable core shaft.

* * * * *